US011326583B2

(12) United States Patent
Avery et al.

(10) Patent No.: US 11,326,583 B2
(45) Date of Patent: May 10, 2022

(54) METHODS FOR CONTROLLING POWER DELIVERED TO AN SMA ACTUATOR

(71) Applicant: CAMBRIDGE MECHATRONICS LIMITED, Cambridge (GB)

(72) Inventors: Christopher Avery, Cambridge (GB); Andrew Benjamin Simpson Brown, Cambridge (GB); Mark Easton, Cambridge (GB)

(73) Assignee: CAMBRIDGE MECHATRONICS LIMITED, Cambridgeshire (GB)

( * ) Notice: Subject to any disclaimer, the term of this patent is extended or adjusted under 35 U.S.C. 154(b) by 0 days.

(21) Appl. No.: 17/257,808

(22) PCT Filed: Jul. 5, 2019

(86) PCT No.: PCT/GB2019/051921
§ 371 (c)(1),
(2) Date: Jan. 4, 2021

(87) PCT Pub. No.: WO2020/008217
PCT Pub. Date: Jan. 9, 2020

(65) Prior Publication Data
US 2021/0285428 A1    Sep. 16, 2021

(30) Foreign Application Priority Data

Jul. 6, 2018   (GB) .................................... 1811097

(51) Int. Cl.
*F03G 7/06*    (2006.01)
(52) U.S. Cl.
CPC .................... *F03G 7/065* (2013.01)

(58) Field of Classification Search
CPC .......... F03G 7/065; G03B 13/36; G03B 5/04; G03B 2205/0015; G03B 2205/0076
See application file for complete search history.

(56) References Cited

U.S. PATENT DOCUMENTS

| 4,930,494 | A | 6/1990 | Sakae et al. |
| 2004/0261411 | A1 | 12/2004 | MacGregor |
| 2006/0150627 | A1 | 7/2006 | Masamichi |
| 2010/0283887 | A1* | 11/2010 | Topliss .................... F03G 7/065 60/527 |

(Continued)

FOREIGN PATENT DOCUMENTS

| JP | 2006340567 | 12/2006 |
| WO | WO 2012066285 | 5/2012 |

*Primary Examiner* — Shafiq Mian
(74) *Attorney, Agent, or Firm* — Haley Guiliano LLP

(57) ABSTRACT

Broadly speaking, embodiments of the present techniques provide techniques for delivering, when required, higher powers to SMA actuator wires by using a single controller/control circuit that implements pulse width modulation (PWM). Typically, when PWM is used to deliver power, the PWM frequency may be fixed, and power may be applied to each SMA actuator wire during each PWM cycle/period. The present techniques provide a method for delivering higher powers to SMA actuator wires (i.e. increasing the length of individual PWM pulses) without changing the duration of the PWM cycle/period. The present techniques also provide techniques for making accurate resistance measurements to determine position of a moveable component that is moved by the SMA actuator wires.

19 Claims, 8 Drawing Sheets

(56) References Cited

U.S. PATENT DOCUMENTS

| | | | |
|---|---|---|---|
| 2011/0179786 A1* | 7/2011 | Topliss | G03B 3/10 60/527 |
| 2011/0279916 A1* | 11/2011 | Brown | G02B 7/08 359/823 |
| 2013/0002933 A1* | 1/2013 | Topliss | H04N 5/23287 310/306 |
| 2013/0300880 A1* | 11/2013 | Brown | G03B 3/10 348/208.1 |
| 2018/0149142 A1* | 5/2018 | Bunting | F03G 7/065 |

* cited by examiner

METHODS FOR CONTROLLING POWER DELIVERED TO AN SMA ACTUATOR

CROSS-REFERENCE TO RELATED APPLICATIONS

This application is a national stage application under 35 U.S.C. § 371 of International Application PCT/GB2019/051921, filed Jul. 5, 2019, which claims priority of GB Patent Application 1811097.3, filed Jul. 6, 2018. The disclosure of which are hereby incorporated by reference herein in their entireties The present application generally relates to apparatus and methods for controlling power delivered to an SMA actuator, and in particular to techniques for delivering higher powers to SMA actuator wires when required.

In a first approach of the present techniques, there is provided an actuator comprising: a static component; a moveable component moveable relative to the static component; at least two shape memory alloy (SMA) actuator wires, each SMA actuator wire having a first portion coupled to the moveable component and a second portion coupled to the static component, where contraction of the SMA actuator wires drives movement of the moveable component; and a controller, coupled to the at least two SMA actuator wires, for generating pulse width modulated (PWM) control signals with a fixed PWM frequency to power the at least two SMA actuator wires, where the PWM control signals are applied in a series of time slots having a duration defined by the PWM frequency, by the controller: dividing each time slot into at least two sub-slots; generating a first PWM signal to apply power to a first SMA actuator wire, the first PWM signal comprising pulses at the PWM frequency; generating a second PWM signal to apply power to a second SMA actuator wire, the second PWM signal comprising pulses at the PWM frequency; and applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire.

As explained in more detail below with reference to the Figures, each time slot may have a duration or length T, and the time slot T may be divided into a number of sub-slots. The sub-slots may have equal length. The number of sub-slots may at least equal to the number of SMA wires n, as each sub-slot may be used to deliver power to an individual SMA wire. Thus, generally speaking, each sub-slot may have a duration equal to T/n. As noted above, each sub-slot may be adjustable such that the duration of one sub-slot may be greater than T/n in a particular time slot (and the duration of one or more sub-slots may be adjusted to compensate for this increase). The length of the sub-slot defines the maximum power deliverable to an SMA actuator wire, because the pulse applied to a particular wire is delivered within a sub-slot. The length of the pulse applied during each sub-slot may be less than or equal to the length of the sub-slot. Thus, increasing the duration of a sub-slot may enable more power to be delivered to an SMA actuator wire because this may enable the duration of the pulse applied during the sub-slot to be increased. The present techniques advantageously enable the duration of individual sub-slots to be adjusted whenever required.

In a second approach of the present techniques, there is provided an apparatus comprising: an actuator for moving a component of the apparatus, the actuator comprising: a static component; a moveable component moveable relative to the static component; and at least two shape memory alloy (SMA) actuator wires, each SMA actuator wire having a first portion coupled to the moveable component and a second portion coupled to the static component, where contraction of the SMA actuator wires drives movement of the moveable component; and a controller, coupled to the actuator, for generating pulse width modulated (PWM) control signals with a fixed PWM frequency to power the at least two SMA actuator wires, where the PWM control signals are applied in a series of time slots having a duration defined by the PWM frequency, by the controller: dividing each time slot into at least two sub-slots; generating a first PWM signal to apply power to a first SMA actuator wire, the first PWM signal comprising pulses at the PWM frequency; generating a second PWM signal to apply power to a second SMA actuator wire, the second PWM signal comprising pulses at the PWM frequency; and applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire.

The apparatus may be any one of: a smartphone, a mobile computing device, a laptop, a tablet computing device, a security system, a gaming system, an augmented reality system, an augmented reality device, a wearable device, a drone, a submersible vessel, an aircraft, a spacecraft, a vehicle, and an autonomous vehicle. It will be understood that this is a non-exhaustive list of possible devices.

In a third approach of the present techniques, there is provided a method for controlling power delivered to an actuator comprising a static component, a moveable component moveable relative to the static component, and at least two shape memory alloy (SMA) actuator wires, each SMA actuator wire having a first portion coupled to the moveable component and a second portion coupled to the static component, where contraction of the SMA actuator wires drives movement of the moveable component, the method comprising: dividing each time slot into at least two sub-slots; generating a first PWM signal to apply power to a first SMA actuator wire, the first PWM signal comprising pulses at the PWM frequency; generating a second PWM signal to apply power to a second SMA actuator wire, the second PWM signal comprising pulses at the PWM frequency; and applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire; wherein the PWM control signals have a fixed PWM frequency and are used to power the at least two SMA actuator wires, and are applied in a series of time slots having a duration defined by the PWM frequency.

In embodiments, within each time slot, the pulse of the second PWM signal which occurs during the second sub-slot may begin immediately after the first sub-slot ends.

In embodiments where the actuator comprises a first group and a second group of SMA actuator wires, the method may further comprise: dividing the first sub-slot into a first group of sub-slots based on the number of wires in the first group, and divides the second sub-slot into a second group of sub-slots based on the number of wires in the second group; generating PWM signals to apply power to each SMA actuator wire of the first and second groups of SMA actuator wires, each signal comprising pulses at the PWM frequency; applying in each time slot, the generated PWM signals for the first group of SMA actuator wires during the first group of sub-slots, and the generated PWM signals for the second group of SMA actuator wires during the second group of sub-slots, where the duration of each sub-slot of the first and second group of sub-slots is adjustable to alter the maximum power deliverable within the first and second group of sub-slots.

The method may further comprise: sending a signal to resistance measurement circuitry to determine resistance of an SMA actuator wire during a selected time slot.

The method may further comprise: determining, prior to sending the signal to the resistance measurement circuitry, whether the PWM pulse to be applied during the sub-slot of the selected time slot has a pulse duration less than a minimum measurement duration; and if so, stretching, the pulse duration of the PWM pulse to equal the minimum measurement duration.

The minimum measurement duration may be, for example, in the range from 0.5 µs to 3.0 µs. In a particular embodiment, the minimum measurement duration may be, for example, 1 µs.

The method may further comprise: allocating a dedicated resistance measurement sub-slot within each time slot, during which resistance of an SMA actuator wire can be determined.

When resistance of an SMA actuator wire is to be determined, the method may comprise: adding a pulse to the PWM signal used to apply power to the SMA actuator wire, where the pulse occurs during the dedicated resistance measurement sub-slot of a selected time slot; and sending a signal to the resistance measurement circuitry to determine resistance of the SMA actuator wire during the dedicated resistance measurement sub-slot of the selected time slot.

When resistance of an SMA actuator wire is not to be determined in a time slot, the method may comprise: adding a pulse to the PWM signal used to apply power to an SMA actuator wires that requires high power, where the pulse occurs during the dedicated resistance measurement sub-slot of the time slot. Generally speaking, the resistance of a particular SMA actuator wire is measured at a frequency that is lower than the PWM frequency. In other words, the resistance of an SMA actuator wire is not measured in every time slot but may be measured every n time slots. In some cases, if resistance is not to be determined in a particular time slot, the dedicated resistance measurement sub-slot may not be used to deliver additional power to one or more SMA actuator wires. That is, in particular time slots, the dedicated resistance measurement sub-slot may not be used for either power delivery or resistance measurement.

In a fourth approach of the present techniques, there is provided circuitry for controlling power delivered to an actuator comprising a static component, a moveable component moveable relative to the static component, and at least two shape memory alloy (SMA) actuator wires, each SMA actuator wire having a first portion coupled to the moveable component and a second portion coupled to the static component, where contraction of the SMA actuator wires drives movement of the moveable component, the circuitry comprising: a controller, coupled to the at least two SMA actuator wires, for generating pulse width modulated (PWM) control signals with a fixed PWM frequency to power the at least two SMA actuator wires, where the PWM control signals are applied in a series of time slots having a duration defined by the PWM frequency, by the controller: dividing each time slot into at least two sub-slots; generating a first PWM signal to apply power to a first SMA actuator wire, the first PWM signal comprising pulses at the PWM frequency; generating a second PWM signal to apply power to a second SMA actuator wire, the second PWM signal comprising pulses at the PWM frequency; and applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire.

The circuitry may comprise at least two switches communicatively coupled to the controller, wherein each SMA actuator is coupled to a first voltage supply rail via one of the at least two switches, and wherein the controller controls operation of the switches using the generated first and second PWM signals.

The circuitry may comprise at least two sense resistors, wherein each SMA actuator is coupled to a second voltage supply rail via one of the at least two sense resistors. In this case, the circuitry may further comprise resistance measurement circuitry for determining the resistance of a selected actuator wire by: measuring the voltage across and/or current through a sense resistor provided in a series arrangement with the selected SMA actuator wire; deriving, using the measurement, the resistance of the sense resistor; and determining, using the derivation, the resistance of the selected SMA actuator wire.

Alternatively, the circuitry may comprise at least one current source, wherein each SMA actuator wire is coupled to the at least one current source. In this case, the circuitry may further comprise at least one digital-to-analogue converter arranged to control a current output of the at least one current source. The circuitry may comprise resistance measurement circuitry for determining the resistance of a selected actuator wire by: measuring voltage across and/or current through the selected actuator wire; and deriving the resistance of the selected SMA actuator wire using the measurement.

Preferred features are set out in the appended dependent claims.

In a related approach of the present techniques, there is provided a non-transitory data carrier carrying processor control code to implement any of the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog® or HDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

Implementations of the present techniques will now be described, by way of example only, with reference to the accompanying drawings, in which.

Broadly speaking, embodiments of the present techniques provide techniques for delivering, when required, higher powers to SMA actuator wires by using a single controller/control circuit that implements pulse width modulation (PWM). Typically, when PWM is used to deliver power, the PWM frequency may be fixed, and power may be applied to each SMA actuator wire during each PWM cycle/period. The present techniques provide a method for delivering higher powers to SMA actuator wires (i.e. increasing the length of individual PWM pulses) without changing the duration of the PWM cycle/period. This may be advantageous because the present techniques can deliver higher powers to individual SMA actuator wires at any given time without causing all the following PWM pulses in the chain to shift in phase. The present techniques also provide techniques for making accurate resistance measurements to determine position of a moveable component that is moved by the SMA actuator wires.

Figure 1:
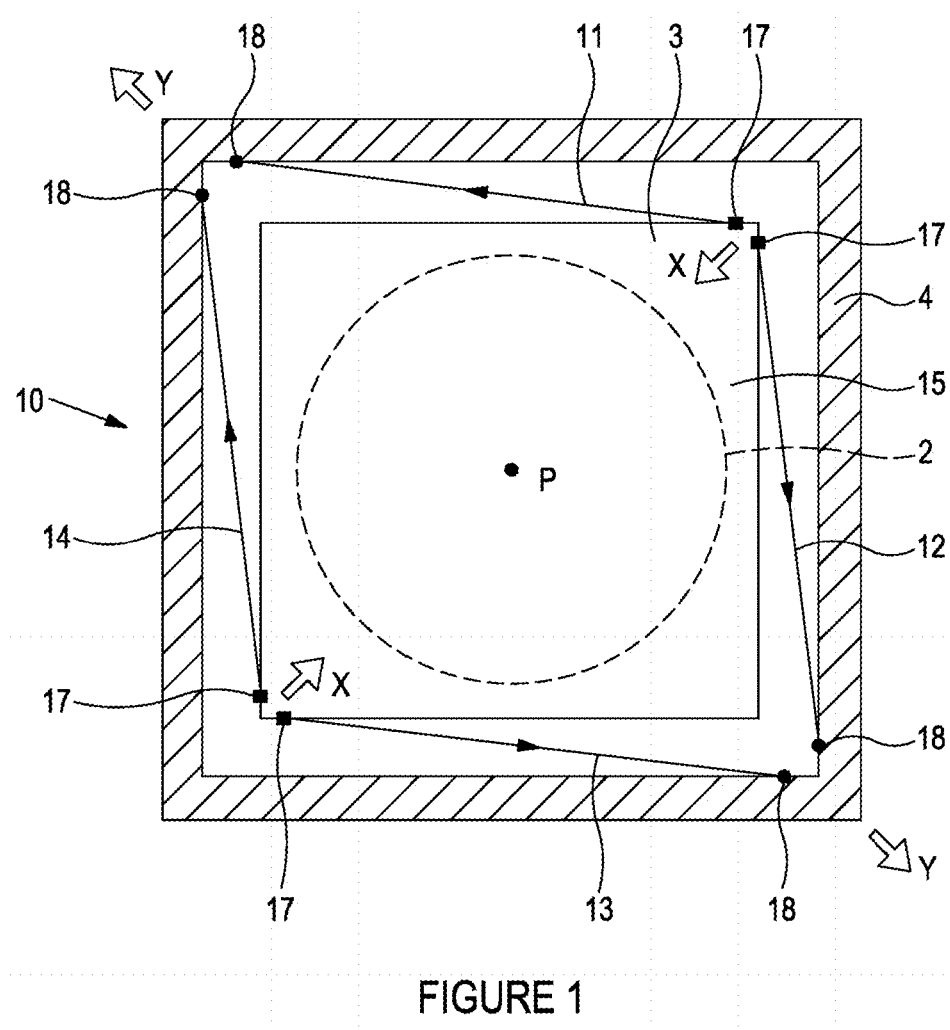
FIG. 1 shows a plan view of an arrangement of shape memory alloy (SMA) actuator wires in an actuator.

FIG. 1 shows a plan view of an arrangement of shape memory alloy (SMA) actuator wires in an actuator 10. The actuator 10 may be incorporated into any apparatus comprising at least one component that requires moving during operation. For example, the actuator 10 may be used to move an optical element of an image capture device, but this is a non-limiting example. The actuator 10 may be incorporated into, for example, a smartphone, a mobile computing device, a laptop, a tablet computing device, a security system, a gaming system, an augmented reality system, an augmented reality device, a wearable device, a medical device, a drug delivery device, a drone (aerial, water, underwater, etc.), a vehicle (e.g. a car, an aircraft, a spacecraft, a submersible vessel, etc.), and an autonomous vehicle. It will be understood this is a non-exhaustive list of example devices into which the present actuator may be incorporated. In some cases, miniaturisation may be an important design criterion for the actuator.

The actuator 10 may, in use, comprise a component 2 that requires moving. The component 2 may be supported on a support structure 4 by a suspension system, in a manner allowing movement of the component 2 relative to the support structure 4 in two orthogonal directions each perpendicular to the primary axis P. In operation, the component 2 may be moved orthogonally to the primary axis P in two orthogonal directions, shown as X and Y.

The actuator 10 may, in embodiments, comprise four shape memory alloy (SMA) actuator wires 11 to 14 that are each connected to support structure 4 and to a movable component 15 that is used move the component 2 that requires moving. (It will be understood that this is just one example arrangement of an SMA actuator—the present techniques apply to an actuator having at least two SMA actuator wires). Each of the SMA actuator wires 11 to 14 is held in tension, thereby applying a force between the movable platform 15 and the support block 16 in a direction perpendicular to the primary axis P. In operation, the SMA actuator wires 11 to 14 move component 2 relative to the support block 16 in two orthogonal directions perpendicular to the primary axis P. The SMA actuator wires 11 to 14 each extend perpendicular to the primary axis P. In this actuator 10, the SMA actuator wires 11 to 14 may extend in a common plane, which may be advantageous in minimising the size of the actuator 10 along the primary axis P (e.g. the overall height or depth of the actuator 10).

Irrespective of whether the SMA actuator wires 11 to 14 are perpendicular to the primary axis P or inclined at a small angle to the plane perpendicular to the primary axis P, the actuator 10 may be made very compact, particularly in the direction along the primary axis P. The SMA actuator wires 11 to 14 may be, in some embodiments, very thin, typically of the order of 25 µm in diameter, to ensure rapid heating and cooling. The arrangement of SMA actuator wires 11 to 14 may not add to the footprint of the actuator 10 and may be made very thin in the direction along the primary axis P, since the SMA actuator wires 11 to 14 are laid essentially in a plane perpendicular to the primary axis P in which they remain in operation. The height along the primary axis may then depend on the thickness of the other components such as crimping members 17 and 18, and on the height necessary to allow manufacture. In practice, it has been found that the actuator arrangement of SMA actuator wires 11 to 14 may be manufactured to a height of less than 1 mm. In the example of a smartphone camera, the size of the SMA actuator wires 11 to 14 typically restricts the angle between the SMA actuator wires 11 to 14 and the plane perpendicular to the primary axis P to be less than 20 degrees, and more preferably less than 10 degrees.

The SMA actuator wires 11 to 14 are connected at one end to the movable platform 15 by respective crimping members 17 and at the other end to the support block 16 by crimping members 18. The crimping members 17 and 18 crimp the wire to hold it mechanically, optionally strengthened by the use of adhesive. The crimping members 17 and 18 also provide an electrical connection to the SMA actuator wires 11 to 14. However, any other suitable means for connecting the SMA actuator wires 11 to 14 may alternatively be used.

SMA material has the property that on heating it undergoes a solid-state phase change which causes the SMA material to contract. On heating of one of the SMA actuator wires 11 to 14, the stress therein increases and it contracts. This causes movement of the component 2. Conversely, on cooling of one of the SMA actuator wires 11 to 14 so that the stress therein decreases, it expands under the force from opposing ones of the SMA actuator wires 11 to 14. This allows the component 2 to move in the opposite direction.

As shown in FIG. 1, the SMA actuator wires 11 to 14 have an arrangement around the primary axis P as follows. Each of the SMA actuator wires 11 to 14 is arranged along one side of the component 2. Thus, the SMA actuator wires 11 to 14 are arranged in a loop at different angular positions around the primary axis P. Thus, the four SMA actuator wires 11 to 14 consist of a first pair of SMA actuator wires 11 and 13 arranged on opposite sides of the primary axis P and a second pair of SMA actuator wires 12 and 14 arranged on opposite sides of the primary axis P. The first pair of SMA actuator wires 11 and 13 are capable on selective driving to move the component 2 relative to the support structure 4 in a first direction in said plane, and the second pair of SMA actuator wires 12 and 14 are capable on selective driving to move the component 2 relative to the support structure 4 in a second direction in said plane transverse to the first direction. Movement in directions other than parallel to the SMA actuator wires 11 to 14 may be driven by a combination of actuation of these pairs of the SMA actuator wires 11 to 14 to provide a linear combination of movement in the transverse directions. Another way to view this movement is that simultaneous contraction of any pair of the SMA actuator wires 11 to 14 that are adjacent each other in the loop will drive movement of the component 2 in a direction bisecting those two of the SMA actuator wires 11 to 14 (diagonally in FIG. 1, as labelled by the arrows X and Y).

As a result, the SMA actuator wires 11 to 14 are capable of being selectively driven to move the component 2 relative to the support structure 4 to any position in a range of movement in two orthogonal directions perpendicular to the primary axis P. The magnitude of the range of movement depends on the geometry and the range of contraction of the SMA actuator wires 11 to 14 within their normal operating parameters.

The position of the component 2 relative to the support structure 4 perpendicular to the primary axis P is controlled by selectively varying the temperature of the SMA actuator wires 11 to 14. This is achieved by passing through SMA actuator wires 11 to 14 selective drive currents that provides resistive heating. Heating is provided directly by the drive current. Cooling is provided by reducing or ceasing the drive current to allow the component 2 to cool by conduction, convection and radiation to its surroundings.

Figure 2:
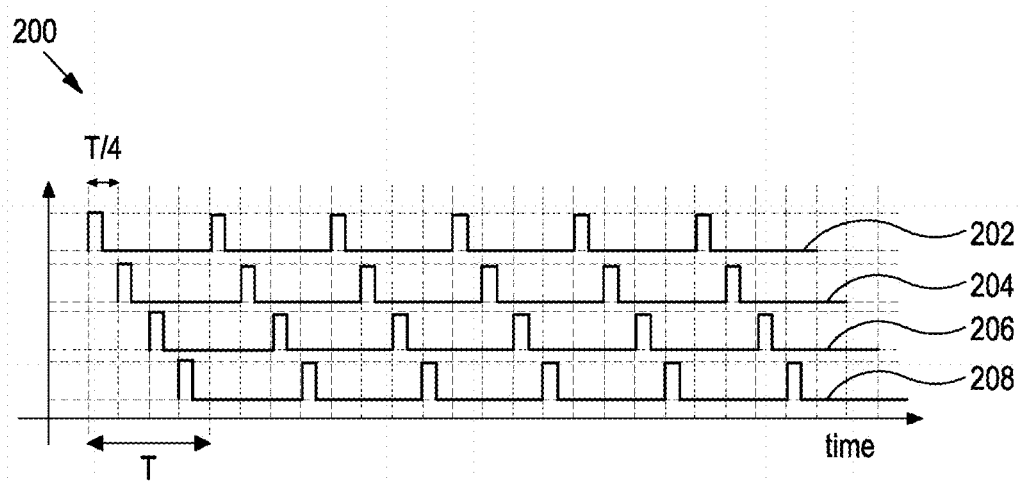
FIG. 2 shows an example timing diagram of a scheme for controlling the SMA actuator wires of an actuator.

FIG. 2 shows an example timing diagram 200 of a scheme for controlling the SMA actuator wires of an actuator. In the example timing diagram 200, four actuator wires are being driven (powered) by a single controller/control circuit using pulse width modulation (PWM), as shown by signals/pulses 202 to 208. One method for applying power to multiple SMA actuator wires using PWM is to have a fixed PWM frequency, and to apply power to one wire in each PWM cycle/period. FIG. 2 shows multiple PWM cycle, where each cycle has a duration T. For clarity, FIG. 2 shows six PWM cycles. This method means that the power applied to each wire is independent of the power applied to any of the other wires. It may be desirable that PWM pulses are not applied to more than one SMA actuator wire at any given time as this may minimise or reduce the instantaneous power that a power supply or regulator needs to deliver.

Thus, FIG. 2 shows one method for powering multiple SMA actuator wires using a single power source. In each cycle T, one SMA actuator wire is driven in turn. In this illustrated example, there are four SMA actuator wires, and each SMA actuator wire is driven during a separate quarter of the period T (i.e. T/4). In other words, the period T may be divided into a number of sub-periods or slots based on the number of SMA actuator wires, and each SMA actuator wire is separately driven during one of these slots. Accordingly, as shown in FIG. 2 during a first cycle T, signal 202 is applied to a first SMA actuator wire during the first T/4 slot, signal 204 is applied to a second SMA actuator wire during the second T/4 slot, signal 206 is applied to a third SMA actuator wire during the third T/4 slot, and signal 208 is applied to a fourth SMA actuator wire during the fourth T/4 slot. Once the first cycle is complete, the next cycle starts during which signal 202 is applied to the first SMA actuator wire during the first T/4 slot, etc. Thus, if, for example, a power pulse is applied to each wire every 400 μs (i.e. T=400 μs), then the maximum pulse length of any pulse will be 100 μs, since each of the four wires is allocated a 100 μs slot during which it can be driven.

This PWM scheme limits the maximum power that may be applied to any one wire, because each signal is applied in a slot of a specific duration (e.g. T/4). Thus, even if one or more wires require a low power, the power applied to another wire may not be increased because the signal can only be applied for the time slot used to drive that wire.

When an actuator comprises opposing SMA actuator wires, such as the actuator shown in FIG. 1, the power required by one wire typically decreases when the power required by another, opposing wire increases. The present techniques exploit this fact to enable a higher power to be delivered to one or more wires during a PWM cycle T. In particular, the present techniques allow the time slot durations for each PWM pulse in a particular PWM cycle T to be varied, such that the maximum power delivered to a wire can be increased (usually because another wire needs less power).

In FIG. 2, each pulse is delivered during a portion of the time slot, such that part of the time slot is not used for delivering power. This means that part of each PWM cycle is not utilised for powering the wires and thus, the maximum power deliverable is limited.

Figure 3:
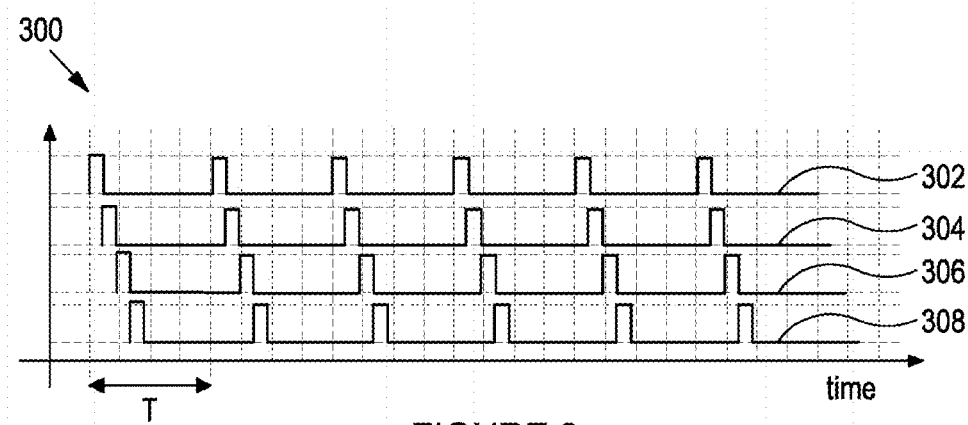
FIG. 3 shows a timing diagram of an improved scheme for controlling the SMA actuator wires of an actuator.

FIG. 3 shows a timing diagram 300 of an improved scheme for controlling the SMA actuator wires of an actuator. For clarity, FIG. 3 shows six PWM cycles. Here, two or more PWM pulses may be stacked during a particular PWM cycle T, such that when one PWM pulse is completed, the next PWM pulse begins. As shown, in any given PWM cycle T, signal 302 is applied to a first SMA actuator wire, signal 304 is applied immediately after signal 302 to a second SMA actuator wire, signal 306 is applied immediately after signal 304 to a third SMA actuator wire, and signal 308 is applied immediately after signal 306 to a fourth SMA actuator wire. FIG. 3 shows how, if the pulse duration per wire is the same as in FIG. 2, a portion at the end of each PWM cycle is unused. This effectively means that the duration of any one or more pulse can be increased, such that the power applied to a wire may be increased. For example, if during a particular PWM cycle T, the first and third wires are powered (or 'on') and the second and fourth wires are not powered or need less power (or are 'off'), then the pulse duration of signal 302 and 306 may be increased to increase the power delivered to the first and third wires. Similarly, in the next PWM cycle T, the pulse duration of signals 304 and 308 may be increased to increase the power delivered to the second and fourth wires.

Accordingly, the present techniques may provide an actuator comprising: a static component; a moveable component moveable relative to the static component; at least two shape memory alloy (SMA) actuator wires, each SMA actuator wire having a first portion coupled to the moveable component and a second portion coupled to the static component, where contraction of the SMA actuator wires drives movement of the moveable component; and a controller, coupled to the at least two SMA actuator wires, for generating pulse width modulated (PWM) control signals with a fixed PWM frequency to power the at least two SMA actuator wires, where the PWM control signals are applied in a series of time slots having a duration defined by the PWM frequency, by the controller: dividing each time slot into at least two sub-slots; generating a first PWM signal to apply power to a first SMA actuator wire, the first PWM signal comprising pulses at the PWM frequency; generating a second PWM signal to apply power to a second SMA actuator wire, the second PWM signal comprising pulses at the PWM frequency; and applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire.

Each time slot may have a duration or length T, and the time slot T may be divided into a number of sub-slots. The number of sub-slots may at least equal to the number of SMA wires n, as each sub-slot may be used to deliver power to an individual SMA wire. Thus, generally speaking, each sub-slot may have a duration equal to T/n. Each sub-slot may be adjustable such that the duration of one sub-slot may be greater than T/n in a particular time slot (and the duration of one or more sub-slots may be adjusted to compensate for this increase). The length of the sub-slot defines the maximum power deliverable to an SMA actuator wire, because the pulse applied to a particular wire is delivered within a sub-slot. The length of the pulse applied during each sub-slot may be less than or equal to the length of the sub-slot. Thus, increasing the duration of a sub-slot may enable more power to be delivered to an SMA actuator wire because this may enable the duration of the pulse applied during the sub-slot to be increased. The present techniques advantageously enable the duration of individual sub-slots to be adjusted whenever required.

In some embodiments, the pulse of the second PWM signal which occurs during the second sub-slot may begin immediately after the first sub-slot ends, such that the signals are 'stacked'. This is shown in, for example, FIGS. 3 and 5. However, in some embodiments, one or more pulses within a time slot may not be stacked (i.e. may not be applied without any gaps between pulses). This is shown in, for example, FIGS. 4 and 6. Whether or not the pulses are stacked, the duration of each sub-slot in a time slot is adjustable to alter the maximum power deliverable to an SMA actuator wire.

When using an SMA actuator to control the position of a moveable component, it may be useful to measure (or determine) the length of each SMA actuator wire in order to determine/extrapolate the position of the moveable component. The length may be determined by measuring the resistance of each SMA actuator wire, as resistance is proportional to length. The resistance of each SMA actuator wire may need to be known in order to determine the precise amount of power to apply to the wire to change the position of the moveable component.

One approach for determining the position of a moveable component is to interleave the resistance measurements between the drive signals. The resistance of each SMA actuator wire may be measured while the SMA actuator wire is being driven. Therefore, the resistance of a particular SMA actuator wire may need to be measured during the time slot of a PWM cycle when it is being powered/driven. It may not be necessary to measure resistance every time an SMA actuator wire is driven. Resistance may be measured at a slower rate than the PWM frequency. For example, a resistance measurement may be made 1 in every n pulses (or cycles), where n may be in the range of 8 to 64—it will be understood this range is illustrative and non-limiting. In embodiments, the resistance of an SMA actuator wire may be measured by sampling the voltage across a series sense resistor when the wire is driven (see FIG. 7). In embodiments, the resistance of an SMA actuator wire may be measured directly when a controlled current is used to drive the wire (see FIG. 8).

However, to make an accurate resistance measurement, a minimum pulse width (duration) may be required in order to allow for any settling times of amplifiers (e.g. operational amplifiers) and/or to account for the acquisition times of any analogue-to-digital converters (ADCs). Thus, this may require the power delivery PWM pulse used to drive an SMA actuator wire to be 'stretched', i.e. for the duration of the pulse to be increased, so that the pulse duration is long enough to enable a resistance measurement to be made. Altering the duration of the pulse may have an undesirable knock-on effect because if one pulse for one wire is made longer, all the following pulses in the chain will shift in phase. This may add significant energy to the wire drive signal at audio frequencies. That is, resistance is typically measured at 2.5 kHz, i.e. a frequency to which the human ear is most sensitive. Thus, the effect of increasing one pulse duration may increase the audible noise of the actuator. Furthermore, it may be computationally expensive to adjust the rising and falling edges of all subsequent pulses if PWM is controlled using software.

Thus, the actuator of the present techniques may comprise resistance measurement circuitry for determining resistance of the at least two SMA actuator wires.

The present techniques provide a number of methods for making resistance measurements without causing a phase shift. These are described below in more detail with respect to FIGS. 4, 5 and 6. The methods involve utilising the unused part of each PWM cycle (see FIG. 3) to increase the length of a pulse applied to one or more SMA actuator wires, such that a resistance measurement may be made without causes the phase of all subsequent pulses to shift. As each SMA actuator wire may need to be powered during each PWM cycle, it may not be possible to increase the duration of any one or more pulses within a cycle by an unlimited amount, because this may prevent power being delivered to other wires.

Figure 4:
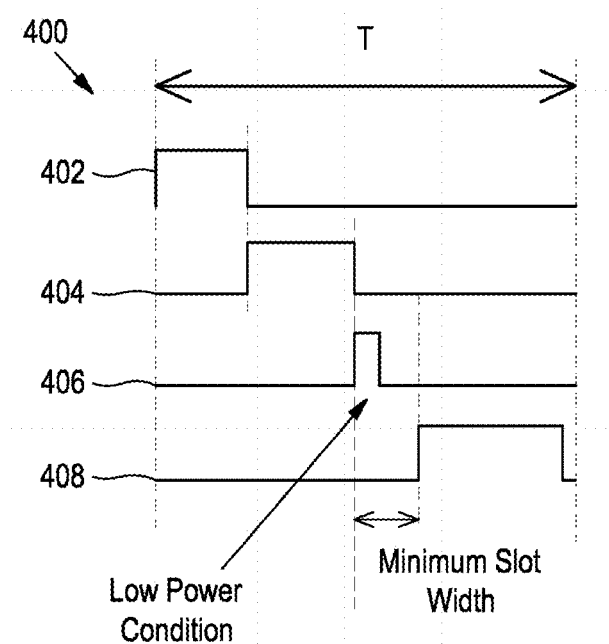
FIG. 4 shows a segment of a timing diagram of a first scheme for maximising power delivered to the wires while enabling resistance measurements to be made.

FIG. 4 shows a segment of a timing diagram of a first scheme for maximising power delivered to the wires while enabling resistance measurements to be made. In this scheme, each wire that is to be powered during a PWM cycle T is assigned a minimum slot width, and the pulses themselves are stacked such that when one PWM pulse is completed, the next PWM pulse begins. The pulse applied to a particular wire does not need to last the whole duration of the minimum slot width. As shown in FIG. 4, signal 402 is applied to a first SMA actuator wire, signal 404 is applied immediately after signal 402 to a second SMA actuator wire, signal 406 is applied immediately after signal 404 to a third SMA actuator wire, and signal 408 is applied after signal 406 to a fourth SMA actuator wire. (In the illustrated example, there is a short gap between signal 406 and signal 408 during which neither the third SMA actuator wire nor the fourth SMA actuator wire is being driven). Each signal 402-408 is allocated a minimum slot width during which it may be able to apply a drive pulse to the corresponding actuator wire. The minimum slot width may be a fraction of the PWM cycle duration T, e.g. equal to or less than T/4 for a four wire actuator. The minimum slot width may be at least equal to the length of time required to make a resistance measurement. In this way, if a pulse duration is not long enough to enable a reliable or accurate resistance measurement to be made, then the pulse duration may be stretched to at least equal the minimum slot width. By defining a minimum slot width to each actuator wire, it may not be possible for any individual actuator wire to be powered for such a long time that other wires are not powered during a particular PWM cycle. Any unused time could be reallocated to other wires that require more power, for example.

In FIG. 4, signals 402 and 404 are applied to the first and second SMA actuator wires, respectively. The third SMA actuator wire is, during the illustrated PWM cycle, in a low power mode such that the pulse applied to the wire is short. As shown, the duration of the pulse of signal 406 is shorter than the minimum slot width. If, during this PWM cycle, a resistance measurement of the third actuator wire is to be taken, the minimum slot width enables the duration of the pulse of signal 406 to be elongated or stretched to a length/duration that enables a more accurate resistance measurement to be made.

The scheme illustrated in FIG. 4 may be useful because a resistance measurement pulse may be insertable into a signal without disturbing or shifting the phase of subsequent pulses. The scheme may also be useful because pulse stretching is only required when a wire is in a low power mode (i.e. a low power is being applied to the wire). Thus, any potential wastage of power delivery by not stretching the pulse duration may not be a concern, because the wire is in a low power mode anyway. The minimum slot width could therefore be defined as the minimum duration required to make a resistance measurement which also minimises potential wastage of power delivery.

In embodiments therefore, the resistance measurement circuitry may make a resistance measurement during a sub-slot in which a PWM pulse is applied to an SMA actuator wire. The resistance measurement circuitry may make the resistance measurement when a pulse duration of the PWM pulse is greater than or equal to a minimum measurement duration. The minimum measurement duration may be in the range of 0.5 μs to 3.0 μs. In particular embodiments, the minimum measurement duration may be 1.0 μs.

The controller may send a signal to the resistance measurement circuitry to determine resistance of an SMA actuator wire during a selected time slot. The controller may determine, prior to sending the signal to the resistance measurement circuitry, whether the PWM pulse to be applied during the sub-slot of the selected time slot has a pulse duration less than the minimum measurement duration, and if the pulse duration is less than the minimum measurement duration, may stretch the pulse duration of the PWM pulse in the sub-slot to at least equal the minimum measurement duration.

Figure 5:
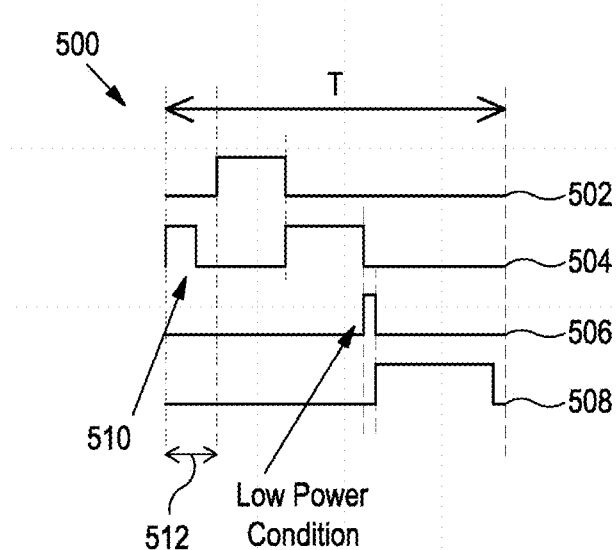
FIG. 5 shows a segment of a timing diagram of a second scheme for maximising power delivered to the wires while enabling resistance measurements to be made.

FIG. 5 shows a segment of a timing diagram of a second scheme for maximising power delivered to the wires while enabling resistance measurements to be made. In this scheme, each PWM cycle T comprises a pre-defined portion or slot 512 which may be used for making resistance measurements. That is, each PWM cycle comprises a dedicated time slot 512 for making resistance measurements. The pre-defined resistance measurement slot 512 may be at the start of each PWM cycle (as shown in FIG. 5), at the end of each PWM cycle, or otherwise. The duration of the pre-defined resistance measurement slot 512 may be at least equal to the minimum duration required for making a resistance measurement. The duration of the pre-defined resistance measurement slot 512 may be optimised to be long enough to allow a resistance measurement to be made, without significantly decreasing the maximum power that can be provided to an actuator wire during a PWM cycle. The remainder of each PWM cycle may be divided between each actuator wire equally or otherwise. In order to make a resistance measurement, the wire which is to be analysed is powered/driven during some or all of the dedicated time slot 512 for making resistance measurements, and while the wire is powered, the resistance of the wire is measured (directly or indirectly). The wire may be powered again during the same cycle.

In FIG. 5, each of the four wires is powered/driven during the PWM cycle shown. The drive pulses applied to each wire are stacked such that when one PWM pulse is completed, the next PWM pulse begins. As shown in FIG. 5, signal 502 is applied to a first SMA actuator wire, signal 504 is applied immediately after signal 502 to a second SMA actuator wire, signal 506 is applied immediately after signal 504 to a third SMA actuator wire, and signal 508 is applied immediately after signal 506 to a fourth SMA actuator wire. In embodiments, each signal 502-508 may be allocated a minimum slot width during which the signal may be applied (as described above with respect to FIG. 4). Alternatively, the signals 502-508 may be of any length (equal or unequal), and may be arranged such that the signals fit within a PWM cycle. The signals 502-508 may be arranged so that they do not overlap. In this scheme, a dedicated time slot 512 for resistance measurements is provided at the start of each PWM cycle. In the illustrated example, the third SMA actuator wire is in a low power state, i.e. is not driven for very long. As a result, the drive pulse of signal 506 applied to the third SMA actuator wire is short, and of insufficient duration to make an accurate resistance measurement. In this case, if the resistance of the third SMA actuator wire is to be measured during this PWM cycle, the resistance is measured during the dedicated time slot 512 instead. The duration of the pulse applied to the third wire may effectively be stretched (as per FIG. 4) to make the resistance measurement, except that some of the pulse occurs during the dedicated time slot 512 and some during the remainder of the PWM cycle.

In the illustrated example, a resistance measurement of the third SMA actuator wire is not required. (This may be because, as mentioned above, resistance may be measured at a slower rate than the PWM frequency. Thus, a resistance measurement may not be made every time a low power condition occurs, but may occur every n times or n cycles). Accordingly, the dedicated time slot 512 is not wasted and may instead be used to power any wire(s) which require more power. Thus, as shown, part of the dedicated time slot 512 is used to drive the second actuator wire, as signal 504 comprises an additional pulse 510 that occurs during the dedicated time slot 512.

The scheme illustrated in FIG. 5 may be useful because the timing of the resistance measurement is fixed in each PWM cycle. This may help remove any dependency of the resistance measurement accuracy on the power delivered to the wires, because the wire to be measured can be powered up specifically during the dedicated time slot 512. Furthermore, when resistance is not being measured, the dedicated time slot 512 can be reallocated to deliver power to one or more wires.

In embodiments, the controller may allocate a dedicated resistance measurement sub-slot within each time slot, during which resistance of an SMA actuator wire can be determined.

The dedicated resistance measurement sub-slot may have a duration greater than or equal to the minimum measurement duration mentioned above.

The dedicated resistance measurement sub-slot may be provided at the start of each time slot. Alternatively, the dedicated resistance measurement sub-slot may be provided at the end of each time slot. The dedicated resistance measurement sub-slot may be in the same place (i.e. at the end or start of each time slot) for all PWM cycles.

When resistance of an SMA actuator wire is to be determined, the controller may add a pulse to the PWM signal used to apply power to the SMA actuator wire, where the pulse occurs during the dedicated resistance measurement sub-slot of a selected time slot; and send a signal to the resistance measurement circuitry to determine resistance of the SMA actuator wire during the dedicated resistance measurement sub-slot of the selected time slot.

When resistance of an SMA actuator wire is not to be determined in a time slot, the controller may add a pulse to the PWM signal used to apply power to an SMA actuator wires that requires high power, where the pulse occurs during the dedicated resistance measurement sub-slot of the time slot.

Figure 6:
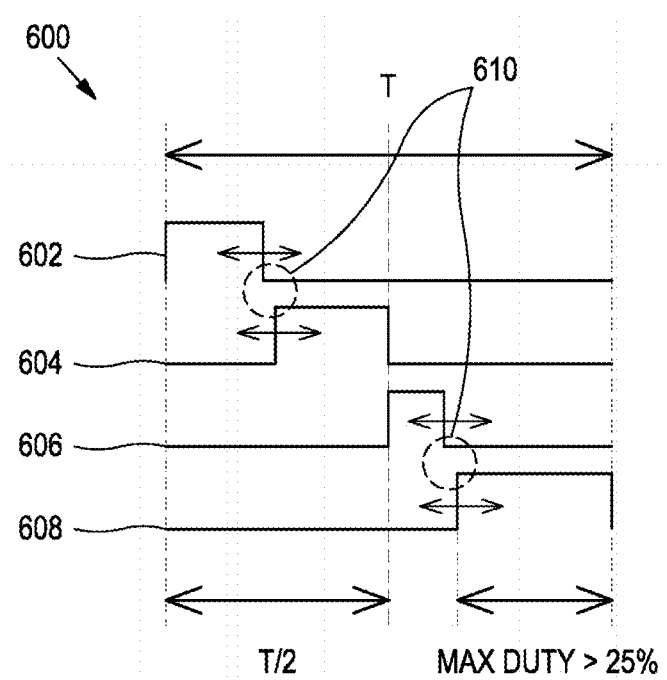
FIG. 6 shows a segment of a timing diagram of a third scheme for maximising power delivered to the wires while enabling resistance measurements to be made.

FIG. 6 shows a segment of a timing diagram of a third scheme for maximising power delivered to the wires while enabling resistance measurements to be made. In this scheme, each PWM cycle T is split in half, and sets of wires may be driven within each half.

For example, in the case where an actuator comprises four SMA actuator wires, and pairs of wires may be driven within each half of the split PWM cycle. Within each pair, the wires may be driven or powered by the same amount in each cycle, or may be 'opposing wires' such that when one wire in a pair is in a high power mode, the other wire in the pair is in a low power mode. Accordingly, each half of each PWM cycle may be used to drive a pair of wires. Within each half of the PWM cycle, and indeed within the whole PWM cycle, the pulses are stacked such that when one PWM pulse is completed, the next PWM pulse begins. As shown in FIG. 6, during the first half of the PWM cycle, signal 602 is applied to a first SMA actuator wire, and signal 604 is applied after signal 602 to a second SMA actuator wire, where the first and second SMA actuator wires may be a pair of wires (e.g. a pair of opposing wires). As shown by the dashed circle 610, there may be a small gap between signal 602 and signal 604, such that power is not applied continuously during the whole time slot. However, the gap could be provided after signal 604, such that signals 602 and 604 are stacked, but there is a gap before signal 606 begins. As indicated by the arrows, the duration of the pulses of signals 602 and 604 may be adjustable within the confines of the split/divided PWM period.

Similarly, during the second half of the PWM cycle, signal 606 is applied immediately after signal 604 to a third SMA actuator wire, and signal 608 is applied after signal 606 to a fourth SMA actuator wire, where the third and fourth SMA actuator wires may be a pair of wires (e.g. a pair of opposing wires). As shown by the dashed circle 610, there may be a small gap between signal 606 and signal 608, such that power is not applied continuously during the whole time slot. However, the gap could be provided before signal 606 begins, or after signal 608 ends. In embodiments therefore, signals 606 and 608 may be stacked, and/or signals 604 and 606 may not be stacked. As indicated by the arrows, the duration of the pulses of signals 606 and 608 may be adjustable within the confines of the split/divided PWM period. Thus, for example, if the third SMA actuator wire is to be in a low power mode and the fourth SMA actuator wire is to be in high power mode, then the duration of the pulse of signal 606 may be decreased and the duration of the pulse of signal 608 may be increased. As shown in FIG. 6, this means that the duration of the pulse of signal 608 applied to the fourth SMA actuator wire may be longer than T/4 (i.e. the duty cycle may be more than 25%).

In another example, an actuator may comprise eight SMA actuator wires, and a set of four wires may be driven within each half of the split PWM cycle. For example, each tension group of four wires may receive the same power in a given PWM cycle and therefore, one tension group may be driven during one half of the PWM cycle and another tension group may be driven during the other half of the PWM cycle. Within each half of the PWM cycle, and indeed within the whole PWM cycle, the pulses are stacked such that when one PWM pulse is completed, the next PWM pulse begins. Furthermore, within each half of the PWM cycle, the duration of the pulses in each half may be adjustable within the confines of the split/divided PWM period. Accordingly, in an 8 wire actuator, the duration of a pulse applied to an SMA actuator wire may be longer than T/8 (i.e. the duty cycle may be more than 12.5%), with the restriction that all four wires in each tension group must be driven within their half of the PWM cycle.

It will be understood that the PWM cycle need not be divided/split equally. The PWM cycle may be divided in two portions in an unequal manner, such that more power could be applied to particular sets of wire. This could be useful if wires are to be driven hard, e.g. if the actuator position needs to change quickly.

Figure 11A:
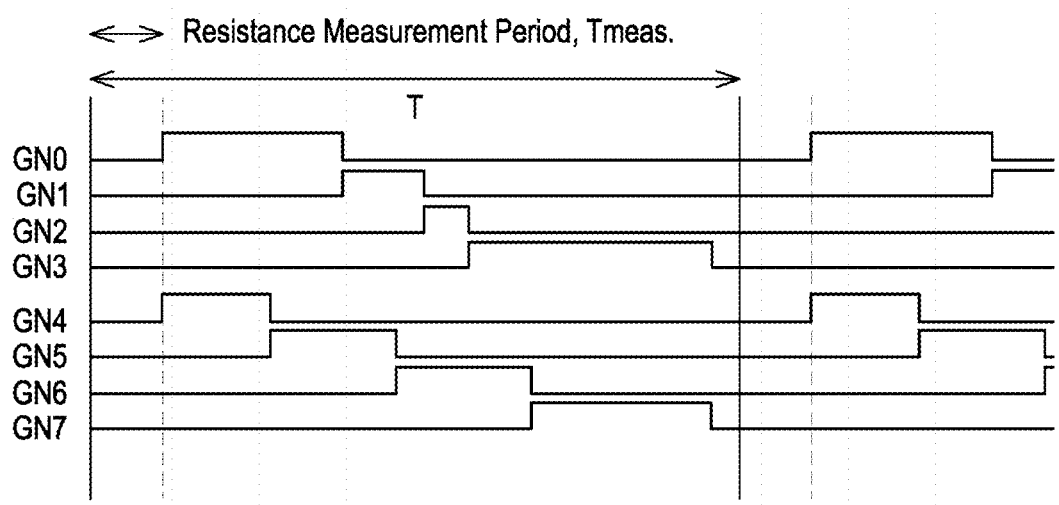
FIG. 11A shows a timing diagram of a scheme for driving two sets of four wires while enabling resistance measurements to be made.

FIG. 11A shows an example timing diagram of a scheme for driving two sets of four wires while enabling resistance measurements to be made. In this example, each set of four wires is considered a tension group. Each tension group may require the same power, such that the sum of the power applied during the four PWM sub-slots used to drive one tension group is equal to the sum of the power applied during the four PWM sub-slots used to drive the other tension group. It will be understood that this technique may apply to tension groups of any size, e.g. tension groups comprising one wire each, two wires each, and so on. FIG. 11A shows how stacked PWM may be implemented for two tension groups each having four wires. A first tension group contains wires GN0 to GN3, and a second tension group contains wires GN4 to GN7. In this example, the timing relationship between the two tension groups may be arbitrary—that is wires from each tension group may be driven simultaneously. This can be seen in FIG. 11A, as wire GN0 of the first tension group is driven at the same time as wire GN4 of the second tension group (and wire GN5).

However, as wires from each tension group may be driven at the same time, it may be necessary to allocate a period of time in each PWM cycle when neither tension group receives power, so that resistance measurements may be made. Accordingly, within each PWM cycle, which has a duration T as shown, a dedicated time slot Tmeas is provided for making a resistance measurement. The pre-defined resistance measurement slot Tmeas may be at the start of each PWM cycle, as shown in FIG. 11A, at the end of each PWM cycle, or otherwise. The duration of the pre-defined resistance measurement slot Tmeas may be at least equal to the minimum duration required for making a resistance measurement. The duration of the pre-defined resistance measurement slot Tmeas may be optimised to be long enough to allow a resistance measurement to be made, without significantly decreasing the maximum power that can be provided to an actuator wire during a PWM cycle. As described earlier, in order to make a resistance measurement, the wire which is to be analysed is powered/driven during some or all of the dedicated time slot Tmeas and, while the wire is powered, the resistance of the wire is measured (directly or indirectly). The wire may be powered again during the same cycle. It is important for the precision of the resistance measurement that no power is delivered to other wires while the resistance of one wire is being measured.

Figure 11B:
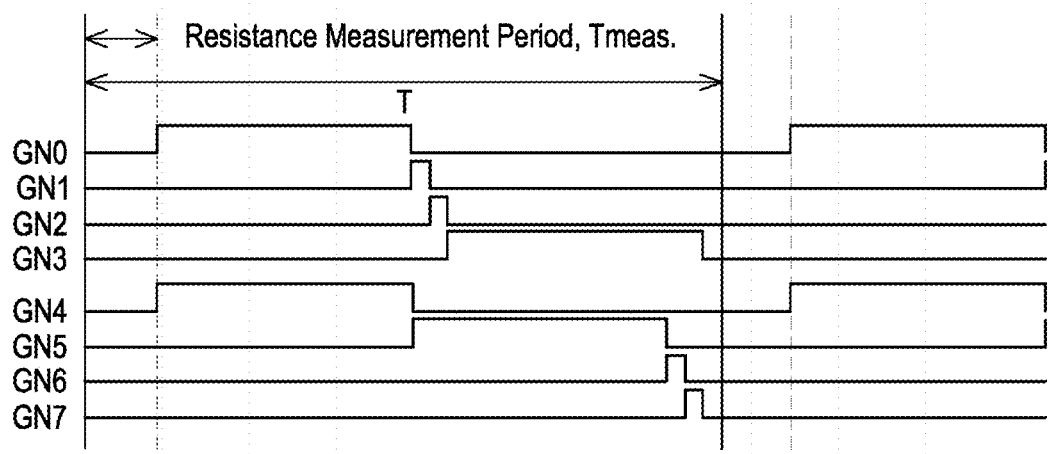
FIG. 11B shows a timing diagram of a scheme for maximising power delivered to two sets of four wires while enabling resistance measurements to be made.

As the PWM pulses are stacked (such that a PWM pulse turns on as the previous PWM pulse turns off), a non-uniform time allocation of the PWM pulses may result. However, as explained above, this may allow the available time to be utilised for optimum power delivery to the wires. FIG. 11B shows a timing diagram of a scheme for maximising power delivered to two sets of four wires while enabling resistance measurements to be made. For particular actuator applications (such as auto-focus in cameras), two wires in each tension group may need to receive maximum power whilst two wires in the same tension group may need to receive very low power. This is shown in FIG. 11B—in the first tension group, GN0 and GN3 (which may be opposing wires or adjacent wires) receive as much power as possible, while wires GN1 and GN2 receive very little power. Similarly, in the second tension group, wires GN4 and wires GN5 receive as much power as possible, while wires GN6 and GN7 receive very little power. The techniques described above to adjust the duration of each sub-slot of the PWM cycle to enable the required power to be delivered to wires GN0 and GN3, and to wires GN4 and GN5. It will be understood that within each PWM cycle, although eight wires may be driven, the tension groups are driven separately/independently of each other. Thus, each PWM cycle may be divided into sub-slots in a different way for each of the tension groups. This can be seen in FIGS. 11A and 11B—the pulses applied to each tension group may vary within a PWM cycle relative to each other.

Thus, in embodiments where the actuator comprises a first group and a second group of SMA actuator wires, the controller may: divide the first sub-slot into a first group of sub-slots based on the number of wires in the first group, and divides the second sub-slot into a second group of sub-slots based on the number of wires in the second group; generate PWM signals to apply power to each SMA actuator wire of the first and second groups of SMA actuator wires, each signal comprising pulses at the PWM frequency; and applies, in each time slot, the generated PWM signals for the first group of SMA actuator wires during the first group of sub-slots, and the generated PWM signals for the second group of SMA actuator wires during the second group of sub-slots, where the duration of each sub-slot of the first and second group of sub-slots is adjustable to alter the maximum power deliverable within the first and second group of sub-slots.

Alternatively, where the actuator comprises a first group and a second group of SMA actuator wires, for the first group the controller may: divide each time slot into a first group of sub-slots based on the number of wires in the first group; generate PWM signals to apply power to each SMA actuator wire of the first group of SMA actuator wires, each signal comprising pulses at the PWM frequency; and apply, in each time slot, the generated PWM signals for the first group of SMA actuator wires during the first group of sub-slots, where the duration of each sub-slot of the first group of sub-slots is adjustable to alter the maximum power deliverable within the first group of sub-slots. The controller may, for the second group: divide each time slot into a second group of sub-slots based on the number of wires in the second group; generate PWM signals to apply power to each SMA actuator wire of the second group of SMA actuator wires, each signal comprising pulses at the PWM frequency; and apply, in each time slot, the generated PWM signals for the second group of SMA actuator wires during the second group of sub-slots, where the duration of each sub-slot of the second group of sub-slots is adjustable to alter the maximum power deliverable within the second group of sub-slots.

As mentioned above with respect to FIGS. 11A and 11B, the controller may apply the generated PWM signals for the first group of SMA actuator wires concurrently with applying the generated PWM signals for the second group of SMA actuator wires in each time slot. That is, each time slot is divided into sub-slots independently for each group of SMA actuator wires, and the wires in a first group are driven/powered in their sub-slots at the same time as the wires in a second group are driven/powered. The time slot may be divided (or the sub-slots for each group may be adjusted) in a different way for each group of SMA actuator wires. That is, the first sub-slot for the first group may have a different duration and end time than then first sub-slot for the second group, the second sub-slot for the first group may have a different duration, start time and end time compared to the second sub-slot for the second group, and so on. This is illustrated in FIGS. 11A and 11B. Thus, the PWM pulses generated for the first group of SMA actuator wires may be different to the PWM pulses generated for the second group of SMA actuator wires.

In embodiments, the first set/group of SMA actuator wires may comprise two wires and the second set/group of SMA actuator wires may comprise two wires. The two wires in each of the first and second sets/groups of SMA actuator wires may be opposing wires. In embodiments, the first set/group of SMA actuator wires may comprise four wires and the second set/group of SMA actuator wires may comprise four wires.

Figure 7:
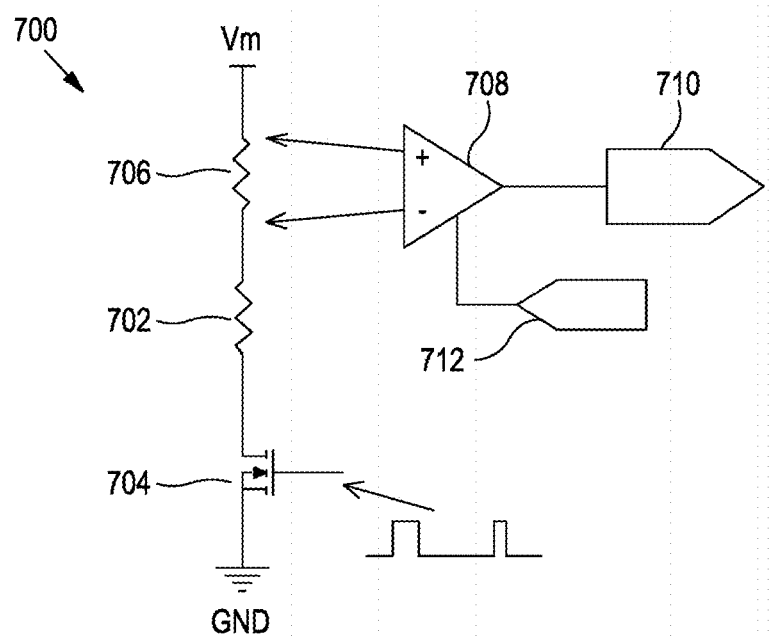
FIG. 7 shows a schematic of an example circuit for driving an SMA actuator wire.

FIG. 7 shows a schematic of an example circuit 700 for driving an SMA actuator wire in accordance with any of the drive schemes described herein. In this arrangement, each SMA actuator wire 702 of an actuator is coupled between the positive supply rail Vm and the negative supply rail GND of circuit 700. Only a single wire 702 is shown here, for the sake of simplicity, but it will be understood that an actuator may comprise any number of SMA actuator wires, each of which may be coupled between the positive and negative supply rails. In this arrangement, each SMA actuator wire 702 may be coupled to the positive supply rail via a sense resistor 706, and to the negative supply rail via a switch 704. The voltage across the sense resistor 706 may be measured and used to calculate the instantaneous current and hence the resistance of the SMA actuator wire 702 itself. Thus, an amplifier 708 (e.g. an op-amp) may be arranged to amplify a voltage across the sense resistor 706, and the resultant amplified signal may be provided to an analogue-to-digital converter (ADC) 710. An input offset voltage may be provided to the amplifier 708 by a digital-to-analogue converter (DAC) 712. When the SMA actuator wire 702 is to be driven, a controller (not shown) may control the operation of switch 704. The switch 704 may be implemented by any suitable switching device, for example a FET (field-effect transistor) such as a MOSFET (metal-oxide-semiconductor field-effect transistor). The controller (or otherwise) may output a control signal during each PWM cycle to operate switch 704 in order to connect the SMA actuator wire 702 to the supply and enable a current to flow through the SMA actuator wire 702 and the sense resistor 706. The control signal may be based on one of the PWM schemes described herein. When a current is flowing, the resistance of the sense resistor 706 may be measured. This measurement may be used as a proxy for measuring the resistance of the SMA actuator wire 702 itself.

Figure 8:
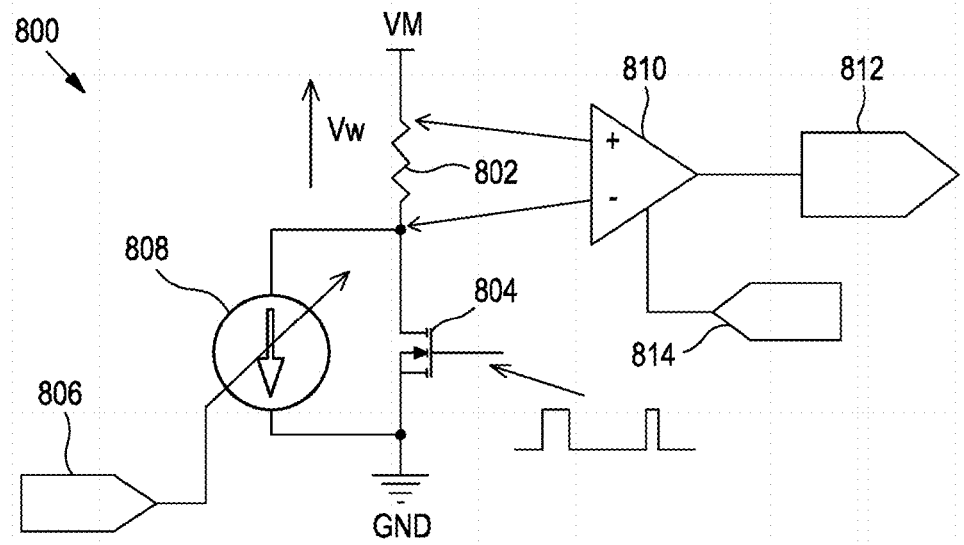
FIG. 8 shows a schematic of an example circuit for driving an SMA actuator wire using a controlled current.

FIG. 8 shows a schematic of an example circuit 800 for driving an SMA actuator wire using a controlled current and in accordance with any of the drive schemes described herein. In this arrangement, each SMA actuator wire 802 of an actuator is coupled between the positive supply rail Vm and the negative supply rail GND of circuit 800. Only a single wire 802 is shown here, for the sake of simplicity, but it will be understood that an actuator may comprise any number of SMA actuator wires, each of which may be coupled between the positive and negative supply rails. In this arrangement, each SMA actuator wire 802 may be coupled to a current source 808 that may supply a current of a predetermined current value. The current source 808 may be implemented by any conventional type of current source having suitably high output impedance. The use of a current source 808 outputting a current of a predetermined value may allow the voltage Vw across the SMA actuator wire 802 to be determined and the resistance of the SMA actuator wire 802 to be measured. A digital-to-analogue converter 806 may be used to control the current output or value of the current source 808.

An amplifier 810 (e.g. an op-amp) may be arranged to amplify the voltage Vw across the SMA actuator wire 802, and the resultant amplified signal may be provided to an analogue-to-digital converter (ADC) 812. An input offset voltage may be provided to the amplifier 810 by a digital-to-analogue converter (DAC) 814. When the SMA actuator wire 802 is to be driven, a controller (not shown) may control the operation of switch 804. The switch 804 may be implemented by any suitable switching device, for example a FET (field-effect transistor) such as a MOSFET (metal-oxide-semiconductor field-effect transistor). The controller (or otherwise) may output a control signal during each PWM cycle to operate switch 804 in order to connect the SMA actuator wire 802 to the supply and enable a current to flow through the SMA actuator wire 802. The control signal may be based on one of the PWM schemes described herein. When a current is flowing, the resistance of the SMA actuator wire 802 may be measured.

Thus, in embodiments the resistance measurement circuitry may determine the resistance of a selected actuator wire by: measuring voltage across and/or current through the selected actuator wire; and deriving the resistance of the selected SMA actuator wire using the measurement. The selected actuator wire is one of the at least two SMA actuator wires of the actuator.

Alternatively, the resistance measurement circuitry may determine the resistance of a selected actuator wire by: measuring the voltage across and/or current through a sense resistor provided in a series arrangement with the selected SMA actuator wire; deriving, using the measurement, the resistance of the sense resistor; and determining, using the derivation, the resistance of the selected SMA actuator wire. The selected actuator wire is one of the at least two SMA actuator wires of the actuator.

Generally speaking, the resistance measurement circuitry may make a resistance measurement at a frequency lower than the PWM frequency. The resistance measurement frequency may be in the range from 1.5 kHz to 5.0 kHz. In particular embodiments, the resistance measurement frequency may be 2.5 kHz.

In embodiments, the controller of the actuator described herein may comprise control circuitry, i.e. may be implemented in hardware. Alternatively, the controller may comprise a processor or microprocessor, i.e. may be implemented using a combination of hardware and software.

Figure 9:
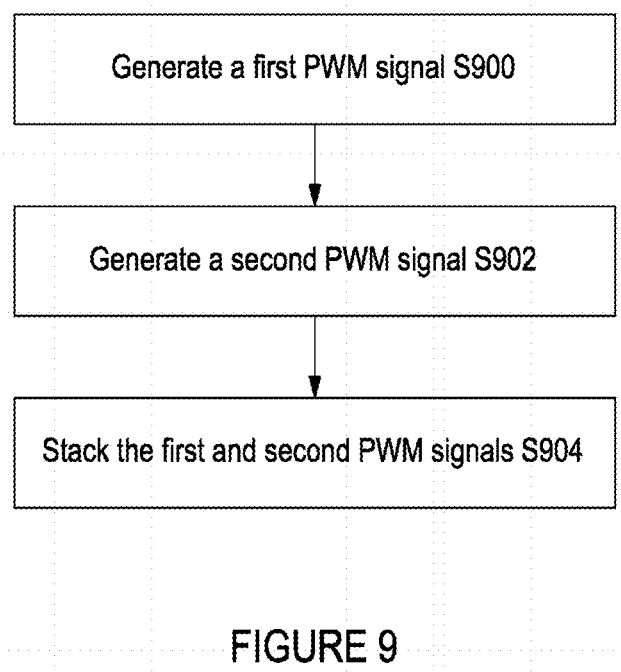
FIG. 9 shows a flowchart of example steps for driving SMA actuator wires.

FIG. 9 shows a flowchart of example steps for driving SMA actuator wires of an actuator. As described above, the actuator comprises a static component, a moveable component moveable relative to the static component, and at least two shape memory alloy (SMA) actuator wires, each SMA actuator wire having a first portion coupled to the moveable component and a second portion coupled to the static component, where contraction of the SMA actuator wires drives movement of the moveable component. The method comprises generating stacked pulse width modulated (PWM) control signals with a fixed PWM frequency to power the at least two SMA actuator wires, where the PWM control signals are applied in a series of time slots. The method begins by generating a first PWM signal to apply power to a first SMA actuator wire (step S900), the first PWM signal comprising pulses at the fixed PWM frequency. At step S902, the method comprises generating a second PWM signal to apply power to a second SMA actuator wire, the second PWM signal comprising pulses at the PWM frequency. At step S904, the method comprises stacking the first and second PWM signals. The signals may be stacked such that in each time slot, a pulse of the first PWM signal occurs during a first sub-slot of the PWM cycle and a pulse of the second PWM signal occurs during a second sub-slot of the PWM cycle, and the pulse of the second PWM signal begins immediately after the pulse of the first PWM signal ends.

Figure 10:
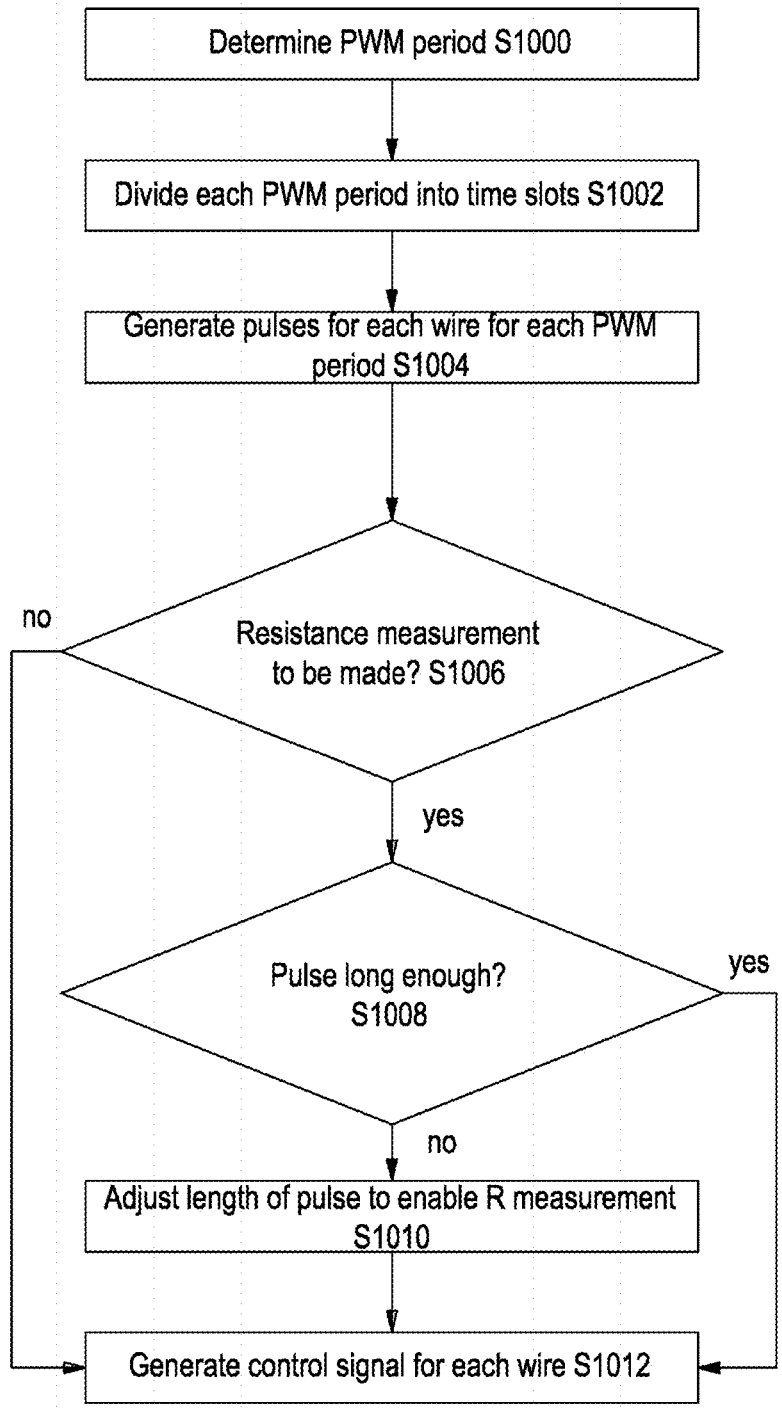
FIG. 10 shows a flowchart of example steps to enable the resistance of SMA actuator wires to be measured.

FIG. 10 shows a flowchart of example steps for enabling resistance of SMA actuator wires to be measured. The method begins by determining the fixed duration of the PWM period or cycle (step S1000), and then dividing each PWM cycle into time slots (step S1002). The number of time slots may be greater than or equal to the number of SMA actuator wires. For example, in embodiments if there are n SMA actuator wires, each PWM cycle may be divided into n time slots during which each wire may be driven. Alternatively, each PWM cycle may be divided into more than n time slots if, for example, a dedicated time slot is required for making resistance measurements (as described above with reference to FIG. 5). The time slots may be of equal length (e.g. as shown in FIG. 3) or may be unequal (e.g. as shown in FIGS. 4 and 5). For each SMA actuator wire, pulses are generated or determined for each PWM cycle (step S1004), based on, for example, whether the SMA actuator wire is to be in a low power state or a high power state during each PWM cycle.

For each cycle, the method may comprise determining if a resistance measurement is to be made for a particular SMA actuator wire during a particular PWM cycle (step S1006). If no resistance measurement is to be made during a particular PWM cycle, the method may proceed to generating a control signal for each SMA actuator wire (step S1012). The control signal for each wire may comprise instructions to apply a pulse to power the SMA actuator wire during an allocated time slot in each PWM cycle, as described earlier. The pulse length of each control signal may be less than or equal to the length of the time slot allocated to the wire.

If a resistance measurement is to be made for a particular SMA actuator wire during a particular PWM cycle, then the method may comprise determining if the length of the pulse generated for that wire in that PWM cycle is long enough for an accurate resistance measurement to be made (step S1006). The method may comprise comparing a minimum duration for a resistance measurement to be made (which may be a predetermined stored value) with the length of the pulse generated for the SMA actuator wire, for example. If the determination indicates the pulse duration is long enough, the method proceeds to step S1012. If the determination indicates the pulse duration is not long enough, the method may comprise adjusting the length of the pulse (step S1010). For example, the pulse length may be increased by stretching the pulse within the time slot during which the pulse is to be applied (as per FIG. 4), or by "stretching" the pulse into a dedicated time slot for resistance measurements (as per FIG. 5). Once the pulse length has been adjusted, control signals for each wire may be generated (step S1012) ready for application.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. An actuator comprising:
   a static component;
   a moveable component moveable relative to the static component;
   at least two shape memory alloy (SMA) actuator wires, each SMA actuator wire having a first portion coupled to the moveable component and a second portion coupled to the static component, where contraction of the SMA actuator wires drives movement of the moveable component;
   resistance measurement circuitry for determining resistance of the at least two SMA actuator wires; and
   a controller, coupled to the at least two SMA actuator wires, for generating pulse width modulated (PWM) control signals with a fixed PWM frequency to power the at least two SMA actuator wires, where the PWM control signals are applied in a series of time slots having a duration defined by the PWM frequency, by the controller:
   dividing each time slot into at least two sub-slots;
   generating a first PWM signal to apply power to a first SMA actuator wire, the first PWM signal comprising pulses at the PWM frequency;
   generating a second PWM signal to apply power to a second SMA actuator wire, the second PWM signal comprising pulses at the PWM frequency; and
   applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire.

2. The actuator as claimed in claim 1 wherein, within each time slot, the pulse of the second PWM signal which occurs during the second sub-slot begins immediately after the first sub-slot ends.

3. The actuator as claimed in claim 1 wherein the actuator comprises a first group and a second group of SMA actuator wires, and wherein the controller:
   divides the first sub-slot into a first group of sub-slots based on the number of wires in the first group, and divides the second sub-slot into a second group of sub-slots based on the number of wires in the second group;

generates PWM signals to apply power to each SMA actuator wire of the first and second groups of SMA actuator wires, each signal comprising pulses at the PWM frequency; and applies, in each time slot, the generated PWM signals for the first group of SMA actuator wires during the first group of sub-slots, and the generated PWM signals for the second group of SMA actuator wires during the second group of sub-slots, where the duration of each sub-slot of the first and second group of sub-slots is adjustable to alter the maximum power deliverable within the first and second group of sub-slots.

4. The actuator as claimed in claim 1 wherein the actuator comprises a first group and a second group of SMA actuator wires, and wherein for the first group the controller:

divides each time slot into a first group of sub-slots based on the number of wires in the first group;

generates PWM signals to apply power to each SMA actuator wire of the first group of SMA actuator wires, each signal comprising pulses at the PWM frequency; and applies, in each time slot, the generated PWM signals for the first group of SMA actuator wires during the first group of sub-slots, where the duration of each sub-slot of the first group of sub-slots is adjustable to alter the maximum power deliverable within the first group of sub-slots, and wherein for the second group the controller:

divides each time slot into a second group of sub-slots based on the number of wires in the second group;

generates PWM signals to apply power to each SMA actuator wire of the second group of SMA actuator wires, each signal comprising pulses at the PWM frequency; and applies, in each time slot, the generated PWM signals for the second group of SMA actuator wires during the second group of sub-slots, where the duration of each sub-slot of the second group of sub-slots is adjustable to alter the maximum power deliverable within the second group of sub-slots.

5. The actuator as claimed in claim 4 wherein the controller applies the generated PWM signals for the first group of SMA actuator wires concurrently with applying the generated PWM signals for the second group of SMA actuator wires in each time slot.

6. The actuator as claimed in claim 4, wherein the PWM pulses generated for the first group of SMA actuator wires are different to the PWM pulses generated for the second group of SMA actuator wires.

7. The actuator as claimed in claim 3, where the first group of SMA actuator wires comprises two wires and the second group of SMA actuator wires comprises two wires, wherein the two wires in each of the first and second groups of SMA actuator wires are opposing wires.

8. The actuator as claimed in claim 3, where the first group of SMA actuator wires comprises four wires and the second group of SMA actuator wires comprises four wires.

9. The actuator as claimed in claim 1, wherein the resistance measurement circuitry makes a resistance measurement during a sub-slot in which a PWM pulse is applied to an SMA actuator wire.

10. The actuator as claimed in claim 1, wherein the controller: sends a signal to the resistance measurement circuitry to determine resistance of an SMA actuator wire during a selected time slot.

11. The actuator as claimed in claim 10 wherein the controller:

determines, prior to sending the signal to the resistance measurement circuitry, whether the PWM pulse to be applied during the sub-slot of the selected time slot has a pulse duration less than a minimum measurement duration; and if the pulse duration is less than the minimum measurement duration, stretches, the pulse duration of the PWM pulse in the sub-slot to at least equal the minimum measurement duration.

12. The actuator as claimed in claim 1, wherein the controller:

allocates a dedicated resistance measurement sub-slot within each time slot, during which resistance of an SMA actuator wire can be determined, wherein the dedicated resistance measurement sub-slot has a duration greater than or equal to a minimum measurement duration.

13. The actuator as claimed in claim 12, wherein the dedicated resistance measurement sub-slot is provided at the start or at the end of each time slot.

14. The actuator as claimed in claim 12, wherein when resistance of an SMA actuator wire is to be determined, the controller:

adds a pulse to the PWM signal used to apply power to the SMA actuator wire, where the pulse occurs during the dedicated resistance measurement sub-slot of a selected time slot; and sends a signal to the resistance measurement circuitry to determine resistance of the SMA actuator wire during the dedicated resistance measurement sub-slot of the selected time slot.

15. The actuator as claimed in claim 12, wherein when resistance of an SMA actuator wire is not to be determined in a time slot, the controller:

adds a pulse to the PWM signal used to apply power to an SMA actuator wires that requires high power, where the pulse occurs during the dedicated resistance measurement sub-slot of the time slot.

16. The actuator as claimed in claim 1, wherein the resistance measurement circuitry determines the resistance of a selected actuator wire by:

measuring voltage across and/or current through the selected actuator wire; and deriving the resistance of the selected SMA actuator wire using the measurement.

17. The actuator as claimed in claim 1, wherein the resistance measurement circuitry determines the resistance of a selected actuator wire by:

measuring the voltage across and/or current through a sense resistor provided in a series arrangement with the selected SMA actuator wire;

deriving, using the measurement, the resistance of the sense resistor; and determining, using the derivation, the resistance of the selected SMA actuator wire.

18. A method for controlling power delivered to an actuator comprising a static component, a moveable component moveable relative to the static component, at least two shape memory alloy (SMA) actuator wires, each SMA actuator wire having a first portion coupled to the moveable component and a second portion coupled to the static component, where contraction of the SMA actuator wires drives movement of the moveable component, and resistance measurement circuitry, the method comprising:
- determining, by the resistance measurement circuitry, resistance of the at least two SMA actuator wires;
- dividing each time slot into at least two sub-slots;
- generating a first PWM signal to apply power to a first SMA actuator wire, the first PWM signal comprising pulses at the PWM frequency;
- generating a second PWM signal to apply power to a second SMA actuator wire, the second PWM signal comprising pulses at the PWM frequency; and
- applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire;
- wherein the PWM control signals have a fixed PWM frequency and are used to power the at least two SMA actuator wires, and are applied in a series of time slots having a duration defined by the PWM frequency.

19. Circuitry for controlling power delivered to an actuator comprising a static component, a moveable component moveable relative to the static component, and at least two shape memory alloy (SMA) actuator wires, each SMA actuator wire having a first portion coupled to the moveable component and a second portion coupled to the static component, where contraction of the SMA actuator wires drives movement of the moveable component, the circuitry comprising:
- resistance measurement circuitry for determining resistance of the at least two SMA actuator wires; and
- a controller, coupled to the at least two SMA actuator wires, for generating pulse width modulated (PWM) control signals with a fixed PWM frequency to power the at least two SMA actuator wires, where the PWM control signals are applied in a series of time slots having a duration defined by the PWM frequency, by the controller:
  - dividing each time slot into at least two sub-slots;
  - generating a first PWM signal to apply power to a first SMA actuator wire, the first PWM signal comprising pulses at the PWM frequency;
  - generating a second PWM signal to apply power to a second SMA actuator wire, the second PWM signal comprising pulses at the PWM frequency; and
  - applying the first and second PWM signals such that in each time slot, a pulse of the first PWM signal occurs during a first sub-slot of the PWM cycle and a pulse of the second PWM signal occurs during a second sub-slot of the PWM cycle, where the duration of each sub-slot is adjustable to alter the maximum power deliverable in the sub-slot to the SMA actuator wire.

* * * * *